(12) United States Patent
Hijii

(10) Patent No.: US 6,597,905 B1
(45) Date of Patent: Jul. 22, 2003

(54) CORDLESS TELEPHONE SYSTEM AND METHOD FOR TRANSFERRING CALLER LINE IDENTIFICATION INFORMATION TO WIRELESS REMOTE HANDSETS

(75) Inventor: Kazuyoshi Hijii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/415,107

(22) Filed: Oct. 8, 1999

Related U.S. Application Data

(63) Continuation-in-part of application No. 08/960,681, filed on Oct. 30, 1997, now abandoned.

(30) Foreign Application Priority Data

Oct. 31, 1996 (JP) ............................................. 8-290058

(51) Int. Cl.$^7$ ................................................. H04M 3/42
(52) U.S. Cl. ........................ 455/415; 455/462; 455/550
(58) Field of Search ................................. 455/461, 550, 455/575, 566, 462, 463, 465, 554, 555, 561, 560, 415, 414, 412

(56) References Cited

U.S. PATENT DOCUMENTS

| | | | |
|---|---|---|---|
| 5,467,383 A | 11/1995 | Urusaka et al. | |
| 5,581,599 A | 12/1996 | Tsuji et al. | |
| 5,703,934 A | 12/1997 | Zicker et al. | |
| 6,049,713 A | * | 4/2000 | Tran et al. ................... 455/412 |
| 6,345,187 B1 | * | 2/2002 | Berthoud et al. ........... 455/462 |

FOREIGN PATENT DOCUMENTS

| | | |
|---|---|---|
| JP | 4-167649 | 6/1992 |
| JP | 4-304756 | 10/1992 |
| JP | 5-284098 | 10/1993 |
| JP | 6-335047 | 12/1994 |
| JP | 8-228230 | 9/1996 |
| JP | 10-136450 | 5/1998 |

* cited by examiner

*Primary Examiner*—Charles N. Appiah
(74) *Attorney, Agent, or Firm*—Scully, Scott, Murphy & Presser

(57) ABSTRACT

A telephone system having a main terminal connected to a telephone cable and at least one wireless remote handset terminal. The telephone system includes: a receiver for receiving caller line identification (CLI) information for a call transmitted across the telephone cable; and a transmitter for transmitting the CLI information for the call that is received to the wireless remote handset terminal that is registered, so that the remote handset terminal displays the CLI information. Wherein the CLI information that is received is stored in a memory only if a remote handset terminal that is registered in the main terminal is not available when the CLI information for the call is received.

8 Claims, 10 Drawing Sheets

FIG. 7

| BIT<br>OCTET | 8 | 7 | 6 | 5 | 4 | 3 | 2 | 1 |
|---|---|---|---|---|---|---|---|---|
| 1 | INSTRUCT RINGING | CALL SERVICE TIPE | | | | | | |
| 2 | OUTSIDE LINE (1) | | OUTSIDE LINE (2) | | OUTSIDE LINE (3) | | | |
| 3 | DOOR PHONE (1) | | DOOR PHONE (2) | | DOOR PHONE (3) | | DOOR PHONE (4) | |
| 4 | EXTENSION (PS1) | | | | | | | |
| 5 | EXTENSION (PS2) | | | | | | | |
| 6 | EXTENSION (PS3) | | | | | | | |
| 7 | NOTIFY STATE | | | | RESERVE | | | |
| 8 | | CONFIRM RECEPTION PS1 | CONFIRM RECEPTION PS2 | | CONFIRM RECEPTION PS3 | | RECEIVED CALL GROUP NUMBER | RESERVE |

FIG. 8A

CLI FLAG 1

| TERMINAL 8 | TERMINAL 7 | TERMINAL 6 | TERMINAL 5 | TERMINAL 4 | TERMINAL 3 | TERMINAL 2 | TERMINAL 1 |
|---|---|---|---|---|---|---|---|
| 0 | 0 | 0 | 0 | 0 | 1 | 1 | 1 |

FIG. 8B

CLI FLAG 1

| TERMINAL 8 | TERMINAL 7 | TERMINAL 6 | TERMINAL 5 | TERMINAL 4 | TERMINAL 3 | TERMINAL 2 | TERMINAL 1 |
|---|---|---|---|---|---|---|---|
| 0 | 0 | 0 | 0 | 0 | 1 | 1 | 0 |

FIG. 9A

| | | |
|---|---|---|
| CLI DATA 1 | 1ST NUMBER | 2ND NUMBER |
| CLI DATA 2 | 3RD NUMBER | 4TH NUMBER |
| ⋮ | 5TH NUMBER | 6TH NUMBER |
| CLI DATA n | ⋮ | ⋮ |
| | 31ST NUMBER | 32ND NUMBER |

FIG. 9B

| bit1 | bit2 | bit3 | bit4 | bit5 | bit6 | bit7 | bit0 |
|---|---|---|---|---|---|---|---|
| 1 | 0 | 1 | 0 | 0 | 0 | 1 | 1 |
| 0 | 1 | 0 | 1 | 0 | 1 | 1 | 0 |
| 0 | 1 | 1 | 1 | 1 | 0 | 0 | 0 |
| 0 | 0 | 0 | 1 | 0 | 0 | 1 | 0 |
| 0 | 0 | 1 | 1 | 0 | 1 | 0 | 0 |
| 0 | 0 | 0 | 0 | 0 | 0 | 0 | 0 |
| ⋮ | | | | ⋮ | | | |
| 0 | 0 | 0 | 0 | 0 | 0 | 0 | 0 |

FIG. 10

CLI FLAG 1 | TERMINAL 8 | TERMINAL 7 | TERMINAL 6 | TERMINAL 5 | TERMINAL 4 | TERMINAL 3 | TERMINAL 2 | TERMINAL 1

CLI FLAG 2 | TERMINAL 8 | TERMINAL 7 | TERMINAL 6 | TERMINAL 5 | TERMINAL 4 | TERMINAL 3 | TERMINAL 2 | TERMINAL 1

...

CLI FLAG n | TERMINAL 8 | TERMINAL 7 | TERMINAL 6 | TERMINAL 5 | TERMINAL 4 | TERMINAL 3 | TERMINAL 2 | TERMINAL 1

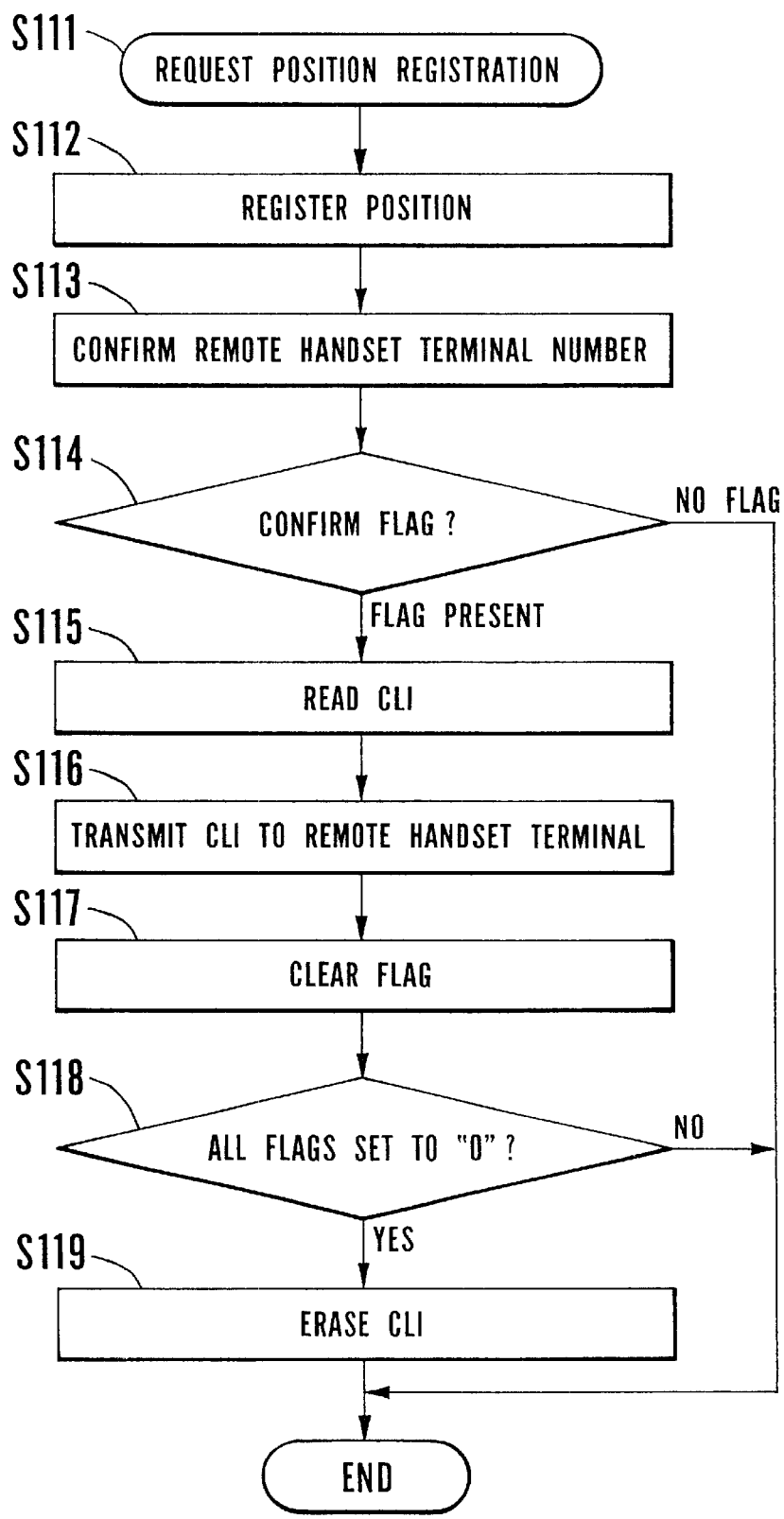

US 6,597,905 B1

CORDLESS TELEPHONE SYSTEM AND METHOD FOR TRANSFERRING CALLER LINE IDENTIFICATION INFORMATION TO WIRELESS REMOTE HANDSETS

CROSS-REFERENCE TO RELATED APPLICATION

The present patent application is a continuation-in-part application of application Ser. No. 08/960,681, filed Oct. 30, 1997, now abandoned.

BACKGROUND OF THE INVENTION

1. Field of Invention

The present invention relates to a telephone system that responds to a ring for a call received across an analog cable and to a signal that carries the telephone number of a caller, and in particular to a cordless telephone system that has a function for storing received data and for transferring data to a terminal registered with the telephone system.

2. Description of the Prior Art

Conventionally, when a telephone system connected to a cable receives CLI (Caller Line Identification) data, i.e., data for the telephone number of a caller, methods are employed whereby the telephone number of the caller is displayed on a display device (e.g., Japanese Unexamined Patent Publication No. Hei 4-304756), or whereby data is transmitted to a remote handset terminal of a telephone system and displayed.

For a cellular telephone, when its power is off, the system can store CLI data, which can be retrieved from the system, as needed.

In a conventional, second-generation cordless home telephone system, where the main terminal is connected to a cable and the main terminal and a plurality of remote handset terminals are connected by radio, when the remote handset terminals are within an area within transmission range of the main telephone terminal for home use, they receive data from the main terminal and are set to the wait state, but do not perform position registration. In a situation where there are no registered remote handset terminals within transmission range or where all of them are powered off, when CLI data is received by the main telephone terminal, since in the area there are no remote handset terminals than can respond, the received CLI data are merely stored in a storage circuit and are displayed on the display device of the main telephone terminal. The data that are stored will not be transferred to a remote handset terminal later, even when it is powered on or is relocated from a remote location and is again within transmission range.

In a case where a remote handset terminal that is the target for the reception of a selective call is out of range, a main telephone terminal for home use will notify all other remote handset terminals of the call and wait for their responses. Upon the receipt of the responses from the remote handset terminals, a communication state is established, and the CLI data that are received are erased without being reported to the remote handset terminal that was the target of the selective call. This operation is also performed for a conference call. Once one of the remote handset terminals is set in the communication state, CLI data is erased, even though there are other remote handset terminals that did not receive the CLI data.

Second-generation cordless telephones (PHSs: Personal Handy Phone Systems) have individual telephone numbers for use in public areas, and can receive CLI data individually. However, since for an area of in and adjacent to a home, a plurality of remote handset terminals share one telephone number, CLI data is not transmitted to a remote handset terminal that is not within transmission range when a call is received.

SUMMARY OF THE INVENTION

It is, therefore, an object of the present invention to provide a telephone system that stores CLI data, and that so manages remote handset terminals, that once a remote handset terminal that was not active in the vicinity of a home, when the CLI data was received, is again within transmission range and requests position registration, the telephone system notifies the remote handset terminal of the receipt of the call and transfers the CLI data that was received.

To achieve the above object, according to the present invention, when a home use main terminal for a second-generation cordless telephone receives a call and CLI data across an analog line, while a remote handset terminal is powered off or is outside the range of the home use main telephone terminal, the main terminal for home use stores the CLI data in its own memory, and transmits the CLI data to the remote handset terminal when the remote handset terminal is again active within range of the home use main terminal and requests position registration.

According to the present invention, a second-generation cordless telephone system, with which a plurality of remote handset terminals are registered, stores CLI data in its own memory upon receipt of a call and holds the CLI data while the registered remote handset terminals are not available. When a remote handset terminal that previously was not available is again active within range of the main terminal and requests position registration, the main terminal notifies the remote handset terminal of the receipt of the call and transmits the CLI data to the remote handset terminal and a call that was received while the remote handset terminal was not available. The remote handset terminal, after receiving the CLI data, displays the CLI data using a display circuit. In this fashion, when an alarm sound is generated in conjunction with the display of the CLI data, a call that was received while the remote handset terminal was not available can be easily identified.

BRIEF DESCRIPTION OF THE DRAWINGS

FIG. 7 is a diagram showing a format for a conference call signal;

FIGS. 8A and 8B are tables showing a change in a CLI flag corresponding to CLI data;

FIG. 9A is a diagram showing a format for storing CLI data;

FIG. 9B is a diagram showing a specific example of CLI data;

FIG. 10 is a diagram showing terminal flags corresponding to CLI data; and

FIG. 11 is a flowchart of the processing performed when the home use main terminal transmits data to a remote handset terminal.

DETAILED DESCRIPTION OF THE PREFERRED EMBODIMENT

The preferred embodiment of the present invention will now be described in detail by reference to the accompanying drawings.

Figure 1:
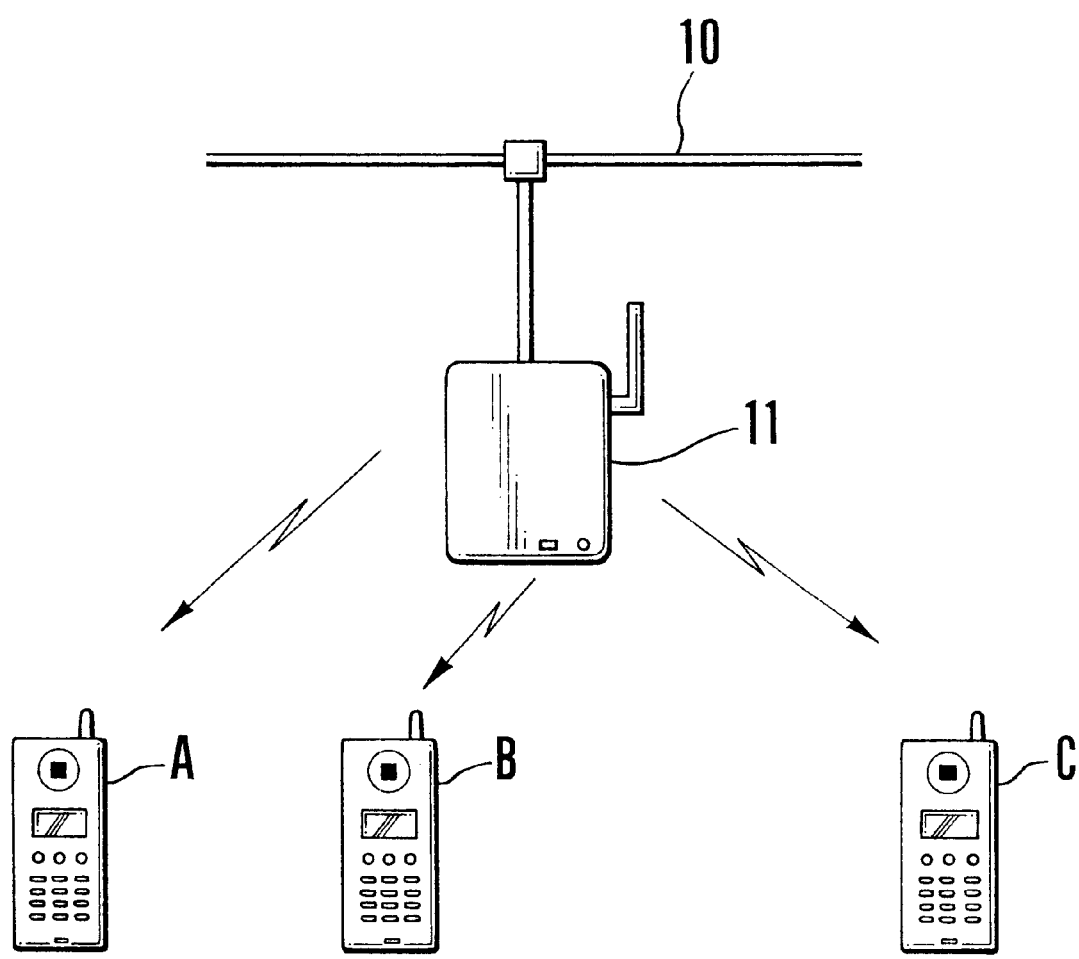
FIG. 1 is a schematic diagram illustrating a home use system for a cordless telephone system according to the present invention.

In FIG. 1, remote handset terminals A, B and C are registered in a second-generation cordless telephone system connected to an analog telephone line 10, i.e., a home use main terminal 11 of a personal handy phone system (PHS).

Figure 2:
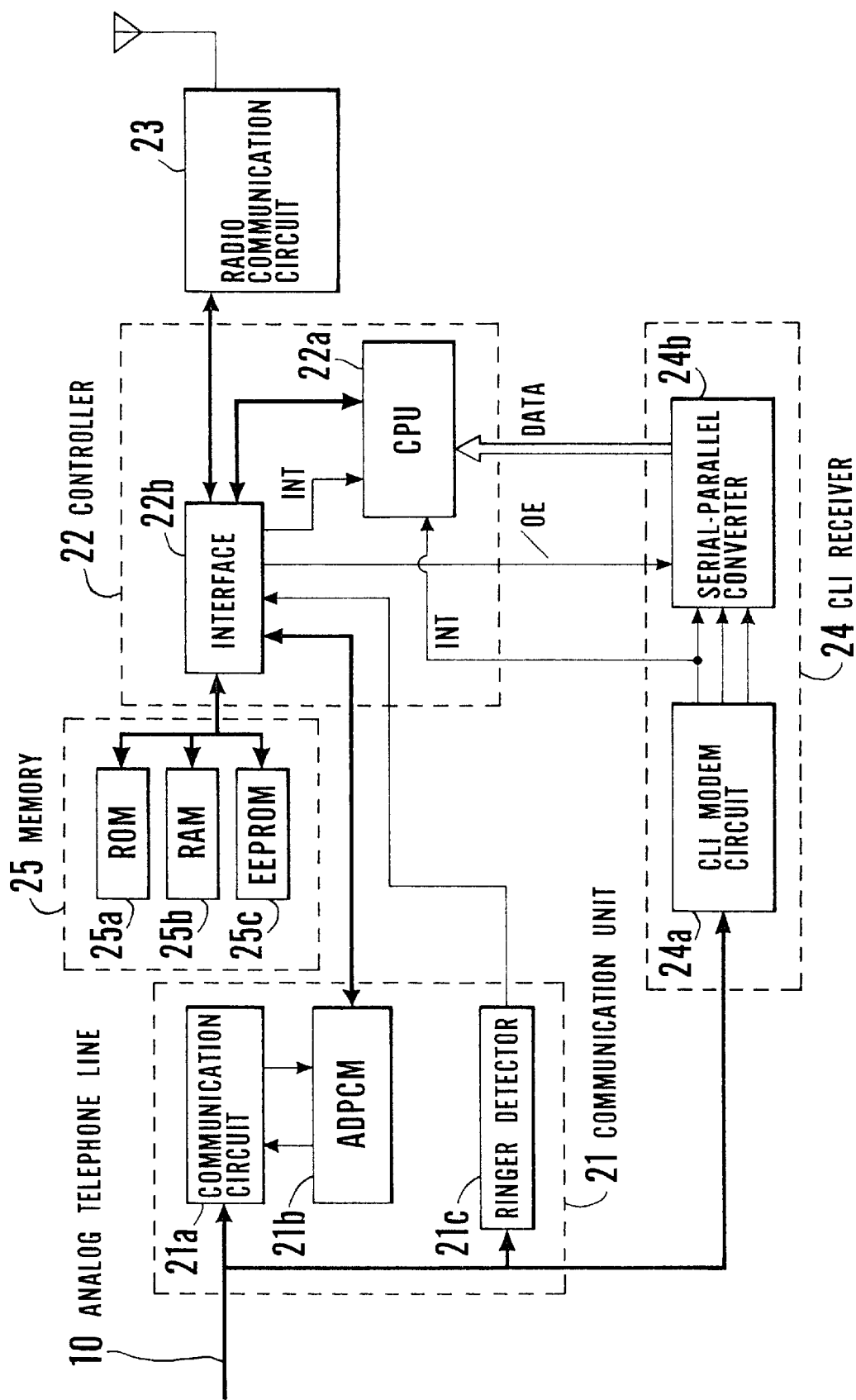
FIG. 2 is a block diagram illustrating the arrangement of the main terminal of the cordless telephone system according to the present invention.

FIG. 2 is a block diagram illustrating the configuration of the home use main terminal shown in FIG. 1.

In FIG. 2, the home use main terminal 11 comprises: a communication unit 21, which acts as an interface with the analog telephone line 10; a CLI receiver 24, for receiving data concerning the telephone number of a caller (CLI) that is output by a switch (not shown) along the analog telephone line 10; a controller 22, for controlling the home use main terminal 11; a radio communication circuit 23, for exchanging data with the remote handset terminals A, B and C; and a memory 25, which is used for storing CLI data.

The communication unit 21 includes a communication circuit 21a, an ADPCM 21b and a ringer detector 21c. The controller 22 includes a CPU 22a and an MPC 22b. The CLI receiver 24 includes a CLI modem circuit 24a and a serial-parallel converter 24b. The memory 25 includes a ROM 25a, a RAM 25b and a EEPROM 25c.

When a first ringer signal is transmitted over the analog telephone line 10 and is detected by the ringer detector 21c, the action is reported to the CPU 22a via the MPC 22b. The CPU 22a enters a wait state and waits to receive CLI data and a second ringer signal. When the CLI modem circuit 24a receives the CLI data, it outputs the data serially in 8-bit groups. The serially output data are converted into 8-bit parallel data groups by the serial-parallel converter 24b. The CPU 22a reads the parallel data in consonance with the timing of an interrupt signal INT that is output by the CLI modem circuit 24a. The CPU 22a extracts only the telephone number of a caller from the CLI data, and prepares and stores data that are to be transmitted to the remote handset terminals A to C, preferably only if at least one of the remote handset terminals that is registered in the main terminal is not available when the CLI information for the call is received. The home use main terminal 11 then transmits to the remote handset terminals A to C, the prepared data, together with a call signal, and displays CLI data on an LCD.

When one of the remote handset terminals responds to the call, the main terminal 11 opens the communication circuit 21a to ensure the establishment of a communication state, and exchanges the data with the remote handset terminal that responded. When the home use main terminal 11 begins communication with the remote handset terminal, the main terminal 11 stores the received CLI data and a flag for the remote handset terminal in the RAM 25b. From among the flags for the remote handset terminals stored in the RAM 25, the flag of a remote handset terminal that has responded to the call and the flags of remote handset terminals for which position registration has been performed are cleared. When all the flags are cleared, the CLI data stored in the RAM 25a are cleared.

Figure 3:
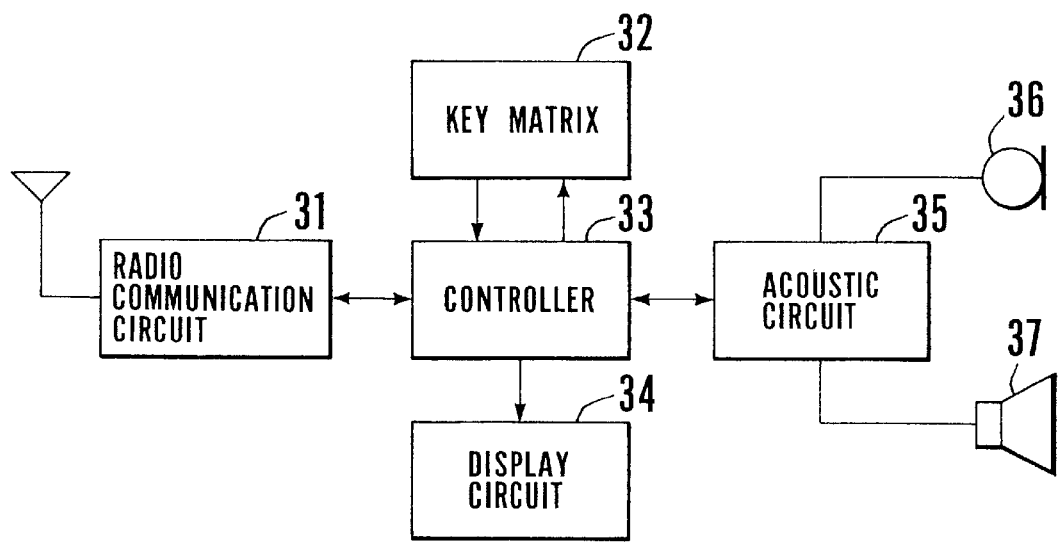
FIG. 3 is a block diagram illustrating the arrangement of a remote handset terminal of the cordless telephone system according to the present invention.

FIG. 3 is a block diagram illustrating the arrangement of the remote handset terminal A shown in FIG. 1.

In FIG. 3, the remote handset terminal A comprises: a radio communication circuit for exchanging data with the home use main terminal 11; a key matrix 32 having number keys and a transmission key; a controller 33 for exercising various types of controls for the remote handset terminal A; a display circuit 34 for displaying the telephone number of a caller; an acoustic circuit 35 for changing from voice to a voice signal or vice versa; a microphone 36; and a loudspeaker 37.

Figure 4:
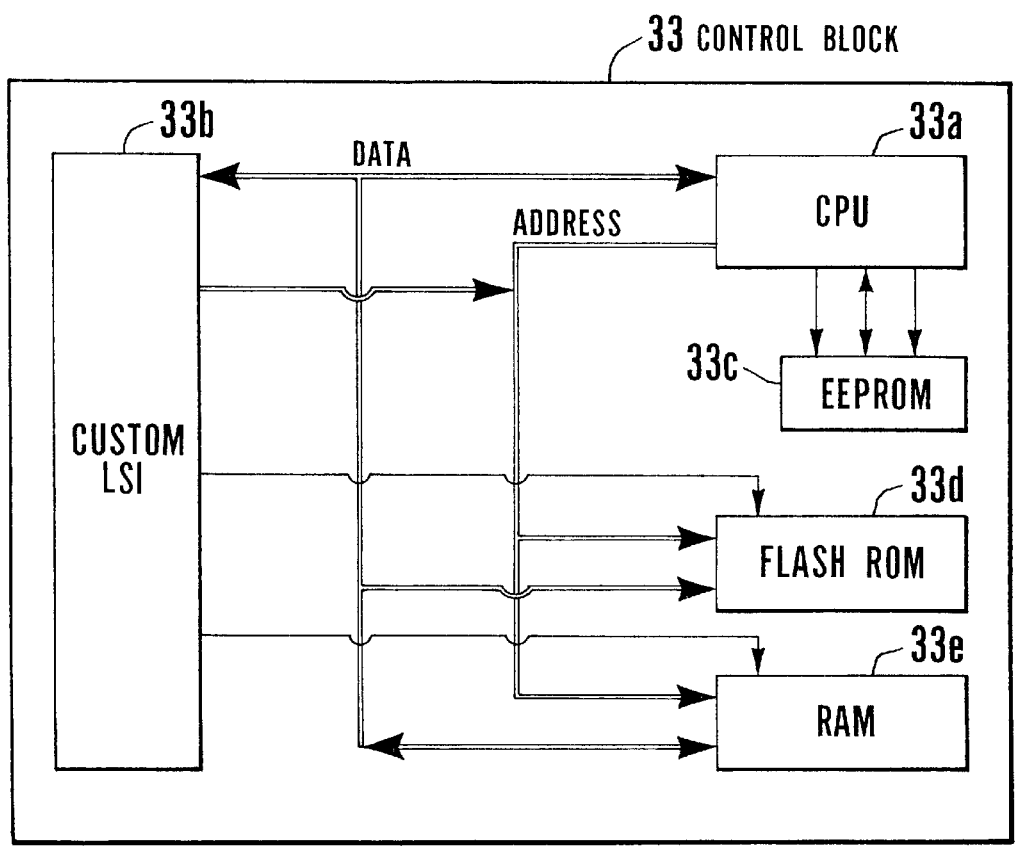
FIG. 4 is a block diagram illustrating an example circuit arrangement of a controller in the remote handset terminal shown in FIG. 3.

As is shown in FIG. 4, the controller 33 includes a CPU 33a, a custom LSI 33b, a EEPROM 33c, a flash ROM 33d and a RAM 33e. The custom LSI 33b has channel codec, ADPCM codec, radio control and timer functions, and a function for monitoring various conditions.

When the remote handset terminal A is relocated to the transmission range of the home use main terminal 11 from a remote location, or when the remote handset terminal A is powered on in the area, the remote handset terminal A detects control data from the main terminal 11. When the remote handset terminal A detects desired data broadcast by the main terminal 11, it requests position registration relative to the main terminal 11. When the main terminal 11 receives the position registration request from the remote handset terminal A, the main terminal 11 employs the terminal number corresponding to the remote handset terminal A to determine whether or not there are pertinent CLI data available in the data stored in the storage circuit. When pertinent CLI data are available, the main terminal transmits the CLI data to the remote handset terminal A, and thereafter clears the CLI data flag for the remote handset terminal A.

When the flags of all the remote handset terminals have been cleared, the main terminal 11 erases the CLI data. The remote handset terminal A displays the received CLI data by using the display circuit 34. And at this time, the acoustic circuit 35 may generate an audible alarm through the loudspeaker 37 to notify a user that CLI data are being displayed.

The remote handset terminals B and C have the same structure as does the terminal A.

The processing performed by the home use main terminal 11 when storing CLI data will now be explained while referring to the flowchart in FIG. 5.

Before this processing is explained, an explanation will be given for a call signal, which includes CLI data, that the home use main terminal 11 receives across the analog telephone line 10, and for a conference call signal that is transmitted from the main terminal 11 to a remote handset terminal.

Figure 6:
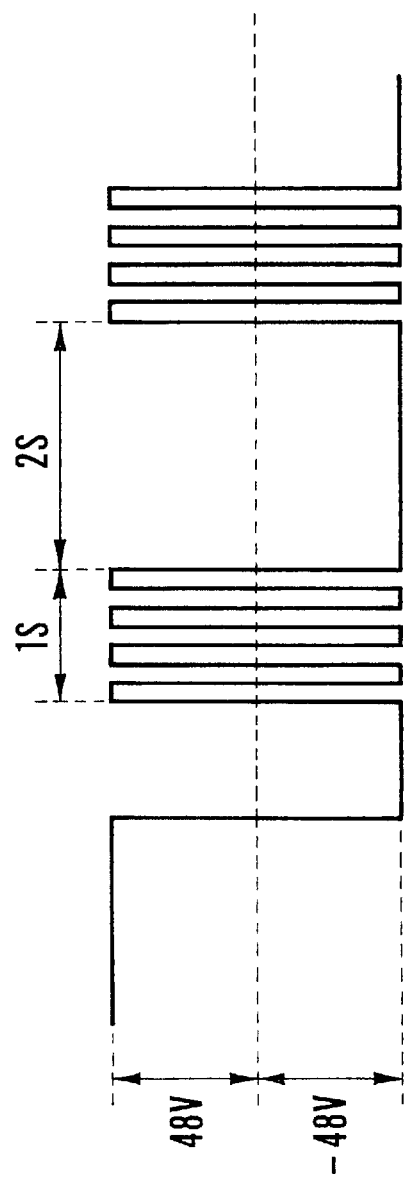
FIG. 6A is a diagram showing a format for a call signal.
FIG. 6B is a diagram showing an example ringer signal.

FIG. 6A is a diagram showing a format for a call signal. The call signal is formed by arranging a first ringer signal, CLI data, a second ringer signal, a third ringer signal, etc., in the named order. As is shown in FIG. 6B, the ringer signal has a repetitious pattern according to which a signal of 16 Hz is continued for one second after polarity is inverted, is halted for two seconds, and then is again continued for one second.

FIG. 7 is a diagram showing an example format for a conference call signal. This format is known in Japan as RCR Standard28.

Figure 5:
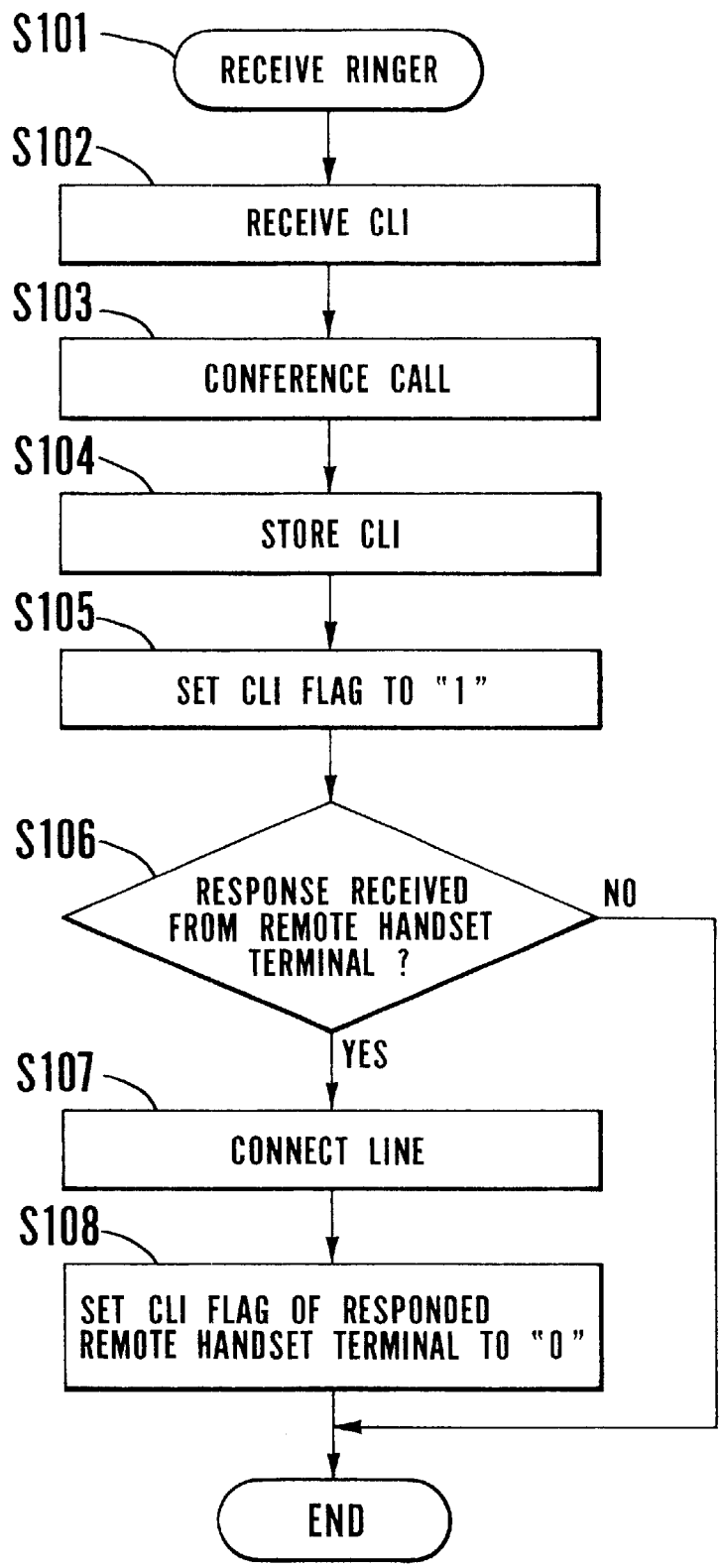
FIG. 5 is a flowchart for explaining the CLI data storage processing performed by the main terminal of the cordless telephone system of the present invention.

Referring to the flowchart in FIG. 5, when the home use main terminal 11 of the second-generation cordless telephone system receives a call signal that includes CLI data (steps S101 and S102), the main terminal 11 transmits a conference call signal to the remote handset terminals A, B and C (step S103). Then, before it receives the responses from the remote handset terminals, the main terminal 11 stores the CLI data in the memory 25 (step S104) only if at least one of the remote handset terminals that is registered in the main terminal is not available when the CLI information for the call is received and sets the flag of a registered remote handset terminal (step S105). In a case as shown in FIG. 1, where three remote handset terminals are registered in the main terminal 11, and assuming that the received CLI data is CLI data 1, as is shown in FIG. 8A CLI flags 1 (the flag of the terminal corresponding to CLI data 1) for the first remote handset terminal A, the second remote handset terminal B and the third remote handset terminal C are set to "1". These flags are stored, for example, in the memory 25.

When one of the remote handset terminals responds to the call signal (YES at step S106), the main terminal 11 executes a line connection to ensure communication with the remote handset terminal (step S107). After the connection is made, the main terminal 11 clears the CLI flag of the pertinent remote handset terminal (step S108). For example, flags are set as is shown in FIG. 8A when the call is received; however, when remote handset terminal 1 responds to the call, the flag for it is cleared, as is shown on FIG. 8B.

When no response by a remote handset terminal is received (NO at step S106), the processing is thereafter terminated. Specifically, program control moves to a process that is performed when a caller hangs up, and the operational mode is returned to a normal mode, i.e., a call ring wait mode. The registration of a remote handset terminal will now be explained.

The operational mode is shifted to a registration mode by depressing a special button when the remote handset terminal is powered on. A register inputs an extension number and an encrypted code for the home use main terminal 11 and waits. Then, the main terminal 11 is activated while a special button at the main terminal 11 is depressed, and waits for a call from the remote handset terminal. When the main terminal 11 is ready, the remote handset terminal transmits data to begin the exchange of data with the main terminal 11. The main terminal 11 obtains from the remote handset terminal information concerning PSID and the extension number, while the remote handset terminal receives key code for reading the encryption. The process is thereafter terminated. The remote handset terminal is thus registered in the home use main terminal 11.

As is shown in FIG. 9A, the four upper bits of the CLI data are assigned for the 1st, 3rd, 5th, 7th, 9th, . . . and 31st numbers and the lower four bits are assigned for the 2nd, 4th, 6th, 8th, 10th, . . . and the 32nd numbers. When, for example, the telephone number of a caller is 03-5678-1234, the format for storing the CLI data is as is shown in FIG. 9B. FIG. 10 is a diagram showing the setup for CLI flags corresponding to individual CLI data.

The processing for transmitting stored data to the remote handset terminal will now be described while referring to the flowchart in FIG. 11.

First, the remote handset terminal A requests position registration in the area of the home use main terminal 11 (step S111). Then, the main terminal 11 not only registers the position of the remote handset terminal A, but also confirms the number of the remote handset terminal A (steps S112 and S113), and searches for the pertinent number among the CLI flags (step S114).

When flag "1" of the pertinent remote handset terminal is found, the controller 22 reads CLI data from the memory 25 (step S115). The controller 22 permits the radio communication circuit 23 to transmit the data to the pertinent remote handset terminal (step S116). The controller 22 then clears the flag that was found (step S117).

When the controller 22 confirms that all the flags for the CLI data have been cleared (step S118), the controller erases the CLI data (step S119). The processing for the transfer of the CLI data is thereafter terminated.

In the above described embodiment, a conference call signal is transmitted once to the remote handset terminals after a call signal has been received. When there is no response, it is preferable that the conference call signal be periodically retransmitted at a time interval that is determined in advance.

The main terminal may perform periodical polling to determine whether a remote handset terminal is available in the area of the main terminal. As a result, even when remote handset terminals in the area do not request position registration, the main terminal can transmit CLI data to a remote handset terminal that is detected by the polling.

Further, time data included in the CLI data may be employed to collect the telephone numbers of callers received during one day.

In the above embodiment, the CLI data are erased after having been transmitted to all the remote handset terminals. The CLI data may be erased when the data has been transmitted to one remote handset terminal. The main terminal may have a function for switching these two data erasure operations.

A home use PHS has been employed in the above embodiment; however, the present invention is not thus limited, and can be applied for a system constituted by a main terminal and a plurality of remote handset terminals.

As is described above, according to the present invention, the home use main terminal stores the telephone numbers of callers who make calls only when a user is absent, that is, only when a user is not available when the call is received. And when a remote handset terminal is relocated to the area of the main terminal and accesses the main terminal for position registration, for example the main terminal identifies the number of the remote handset terminal and transmits, to the remote handset terminal, the telephone number of the caller that is stored. Therefore, a user can identify a person who called while the user was absent, and can, as needed, call the caller back.

In addition, according to the present invention, since the telephone number of a caller can be transmitted to individual remote handset terminals, the individuals who have the remote handset terminals can identify the caller.

Furthermore, according to the present invention, the telephone numbers of calls that are received during one day can be accumulated by using a function for storing the telephone numbers of callers. Therefore, the relative urgency of each call received from callers in one day can be acquired and can be employed to select a person to be called back. Since the CLI data includes the date, the time and the telephone number of a caller, the controller employs the date data to accumulate the calls for one day.

What is claimed is:

1. A telephone system having a main terminal connected to a telephone cable and at least one wireless remote handset terminal, the telephone system comprising:

means for receiving caller line identification (CLI) information for a call transmitted across said telephone cable;

means for transmitting said CLI information for said call that is received to said wireless remote handset terminal that is registered, so that said remote handset terminal displays said CLI information, wherein said CLI information that is received is stored in a memory only if a remote handset terminal that is registered in said main terminal is not available when said CLI information for said call is received; and switch means for erasing said CLI information stored in said memory when said CLI information has been transmitted to said at least one remote handset terminals, and means for erasing said CLI information stored in said memory when said CLI information has been transmitted to all of the at least one remote handset terminals;

wherein flags are employed to indicate the presence or absence of said at least one remote handset terminals that are registered in said main terminal, and said CLI information stored in said memory in conjunction with a flag for each at least one remote handset terminal that is registered.

2. The telephone system according to claim 1, wherein a periodical check is performed to determine whether or not a remote handset terminal that is registered in said main terminal is available.

3. The telephone system according to claim 1, wherein CLI information that has been received when no remote handset terminal that is registered is available is read from said memory and transmitted to each at least one remote handset terminal that is determined to be registered.

4. A telephone system having a main terminal connected to a telephone cable and at least one wireless remote handset terminals, the telephone system comprising: means for receiving caller line identification (CLI) information for a call transmitted across said telephone cable; means for transmitting said CLI information for said call that is received to said wireless remote handset terminal that is registered, so that said remote handset terminal displays said CLI information, switch means for erasing said CLI information stored in said memory when said CLI information has been transmitted to said at least one remote handset terminals, and means for erasing said CLI information stored in said memory when said CLI information has been transmitted to all of the at least one remote handset terminals.

5. The telephone system according to claim 4, wherein a periodical check is performed to determine whether or not one of the at least one remote handset terminals that is registered in said main terminal is available.

6. The telephone system according to claim 5, wherein said CLI information that is received is stored in a memory depending on whether or not a remote handset terminal that is registered in said main terminal is available when said CLI information for said call is received.

7. The telephone system according to claim 6, wherein said CLI information that has been received when no remote handset terminal that is registered is available is read from said memory and transmitted to each at least one remote handset terminal that is determined to be registered.

8. The telephone system according to claim 7, wherein flags are employed to indicate the presence or absence of said at least one remote handset terminals that are registered in said main terminal, and said CLI information stored in said memory in conjunction with a flag for each at least one remote handset terminal that is registered.

* * * * *